(12) United States Patent
Kawasaki et al.

(10) Patent No.: US 11,952,042 B2
(45) Date of Patent: Apr. 9, 2024

(54) LOWER VEHICLE-BODY STRUCTURE OF VEHICLE

(71) Applicant: Mazda Motor Corporation, Hiroshima (JP)

(72) Inventors: Mikado Kawasaki, Hiroshima (JP); Hirotaka Natsume, Hiroshima (JP); Keisuke Ebisumoto, Hiroshima (JP); Akiko Nakamoto, Hiroshima (JP); Daisuke Tsuji, Hiroshima (JP); Kento Otsuka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 184 days.

(21) Appl. No.: 17/718,339

(22) Filed: Apr. 12, 2022

(65) Prior Publication Data
US 2022/0348262 A1    Nov. 3, 2022

(30) Foreign Application Priority Data

Apr. 30, 2021    (JP) .................................. 2021-077947

(51) Int. Cl.
| | | |
|---|---|---|
| *B62D 21/15* | (2006.01) | |
| *B62D 25/02* | (2006.01) | |
| *B62D 25/20* | (2006.01) | |
| *B62D 27/02* | (2006.01) | |

(52) U.S. Cl.
CPC ......... *B62D 21/157* (2013.01); *B62D 25/025* (2013.01); *B62D 25/20* (2013.01); *B62D 25/2036* (2013.01); *B62D 27/023* (2013.01)

(58) Field of Classification Search
CPC .. B62D 25/025; B62D 25/2036; B62D 25/20; B62D 21/157; B62D 27/023
USPC .................. 296/204, 209, 29, 193.07, 187.12
See application file for complete search history.

(56) References Cited

U.S. PATENT DOCUMENTS

| | | | | |
|---|---|---|---|---|
| 7,025,412 | B2 * | 4/2006 | Nakamura ......... | B62D 25/2036 296/193.07 |
| 10,155,542 | B2 * | 12/2018 | Gao ...................... | B62D 21/157 |
| 11,524,726 | B2 * | 12/2022 | Fujisawa .................. | B60K 1/04 |
| 11,618,505 | B2 * | 4/2023 | Ravantab ............. | B62D 21/157 296/187.12 |
| 2017/0210426 | A1 | 7/2017 | Gao et al. | |

\* cited by examiner

*Primary Examiner* — Dennis H Pedder
(74) *Attorney, Agent, or Firm* — XSENSUS LLP

(57) ABSTRACT

A lower vehicle-body structure of a vehicle may include: a floor panel; a side sill; and a frame member that extends in the front-rear direction on the vehicle-width-direction inner side of the side sill and includes a front-rear extended portion that is in abutment against the side sill on the vehicle-width-direction inner side and extends in the vehicle front-rear direction along the side sill. The front-rear extended portion may include: a bottom face portion; an inner wall portion; and an inner-side flange that extends to the vehicle-width-direction inner side from a distal end portion of the inner wall portion and is joined to the floor panel. Deformation facilitating facilitators that facilitate deformation of the bottom face portion in the vehicle width direction when a collision load in the vehicle width direction is input may be formed in the bottom face portion.

12 Claims, 9 Drawing Sheets

LOWER VEHICLE-BODY STRUCTURE OF VEHICLE

CROSS-REFERENCE TO RELATED APPLICATION

The present application claims priority to Japanese patent application JP 2021-077947, filed Apr. 30, 2021, the entire contents of which being incorporated herein by reference in its entirety.

TECHNICAL FIELD

The present disclosure relates to a lower vehicle-body structure of a vehicle.

BACKGROUND ART

In Patent Literature 1, a lower vehicle-body structure of a vehicle is disclosed that includes a frame member that extends in the front-rear direction on the vehicle-width-direction inner side of a side sill and forms a closed cross-section together with a floor panel by being joined to the floor panel from below, the frame member having a front-rear extended portion that is in abutment against the side sill on the vehicle-width-direction inner side and extends in the vehicle front-rear direction along the side sill. The side sill is supported by the frame member, in particular, the front-rear extended portion, from the vehicle-width-direction inner side and the inward falling deformation at the time of a side collision is suppressed.

The front-rear extended portion has a first face portion that faces the floor panel from below, an inner wall portion that extends toward the floor panel from an inner end portion of the first face portion in the vehicle width direction, and an inner-side flange that extends to the vehicle-width-direction inner side from a distal end portion of the inner wall portion and is joined to the floor panel.

CITATION LIST

Patent Literature

[Patent Literature 1] U.S. Pat. No. 10,155,542

SUMMARY

Problems to be Solved

The frame member constitutes a skeleton portion of a vehicle body. Therefore, the frame member is generally composed of a member having a higher rigidity than a steel plate that constitutes the floor panel (for example, a member with a thick plate thickness). In other words, in the closed cross-section formed by the frame member and the floor panel, the first face portion of the front-rear extended portion and the floor panel that face each other in the up-down direction have different rigidities. Specifically, the first face portion has a higher rigidity than the floor panel.

Therefore, in the lower vehicle-body structure of the vehicle in Patent Literature 1, when a collision load toward the vehicle-width-direction inner side acts on the front-rear extended portion via the side sill at the time of a side collision, the deformation amount of a portion of the floor panel that faces the first face portion easily becomes excessively large as compared to the deformation amount of the first face portion. As a result, in the front-rear extended portion, an excessive shearing strain is generated in a joined portion in the inner-side flange that is joined to the floor panel, the joined portion breaks, and the front-rear extended portion drops from the floor panel.

When the front-rear extended portion drops from the floor panel, the support for the side sill by the front-rear extended portion is removed. Therefore, the effect of suppressing the inward falling of the side sill described above by the front-rear extended portion at the time of a side collision decreases.

A problem to be solved by the present disclosure is to provide a lower vehicle-body structure of a vehicle capable of maintaining a support effect for a side sill by a front-rear extended portion even at the time of a side collision.

Means for Solving the Problem

In order to solve the abovementioned problem, the disclosure of the present application is characterized by the following configurations.

Some embodiments of the present disclosure provide a lower vehicle-body structure of a vehicle, the lower vehicle-body structure including:
  a floor panel that constitutes a floor face portion of the vehicle;
  a side sill that extends in a vehicle front-rear direction on a vehicle-width-direction end portion of the vehicle; and
  a frame member that extends in a front-rear direction on a vehicle-width-direction inner side of the side sill and forms a closed cross-section together with the floor panel by being joined to the floor panel in an up-down direction, the frame member including a front-rear extended portion that is in abutment against the side sill on the vehicle-width-direction inner side and extends in the vehicle front-rear direction along the side sill,
  wherein the front-rear extended portion includes:
    a first face portion that faces the floor panel in the up-down direction;
    an inner wall portion that extends toward the floor panel from an inner end portion of the first face portion in a vehicle width direction; and
    an inner-side flange that extends to the vehicle-width-direction inner side from a distal end portion of the inner wall portion and is joined to the floor panel, and
    a deformation facilitating portion or facilitator that facilitates deformation of the first face portion in the vehicle width direction when a collision load in the vehicle width direction is input is formed in the first face portion.

According to some embodiments of the present disclosure, when the collision load in the vehicle width direction is input to the front-rear extended portion via the side sill at the time of a side collision, the deformation of the first face portion in the vehicle width direction can be facilitated via the deformation facilitating portion. As a result, the deformation amount of the first face portion generally having a higher rigidity than the floor panel becomes closer to the deformation amount of the portion of the floor panel that faces the first face portion.

Accordingly, the shearing strain pertaining to the joined portion between the inner-side flange and the floor panel decreases, and hence the joining in the inner-side flange is easily maintained. Therefore, the closed cross-section of the front-rear extended portion is easily maintained, and the support for the side sill by the front-rear extended portion from the vehicle-width-direction inner side is easily maintained. Thus, the inward falling deformation of the side sill is suppressed.

The deformation facilitating portion may be a bead that extends in the front-rear direction or a hole that penetrates in a vehicle up-down direction.

With this configuration, in the front-rear extended portion, the deformation facilitating portion can be easily formed in the first face portion as the bead or the hole in an integral manner by press molding, for example. As the bead in this configuration, either a bead that is concave to the inner side (in other words, the floor pan side) of the closed cross-section or a bead that is convex to the outer side (in other words, the side opposite to the floor pan side) of the closed cross-section may be used.

A plurality of the deformation facilitating portions may be provided, and the plurality of deformation facilitating portions may include at least two of the deformation facilitating portions that are disposed side by side in the vehicle width direction.

With this configuration, the first face portion is easily deformed so as to be compressed in the vehicle width direction in a reliable manner in the positions in which the at least two deformation facilitating portions disposed side by side in the vehicle width direction are formed.

A plurality of the deformation facilitating portions may be provided, and the plurality of deformation facilitating portions may include at least two of the deformation facilitating portions that are disposed side by side in the vehicle front-rear direction.

With this configuration, by the at least two deformation facilitating portions disposed side by side in the vehicle front-rear direction, the first face portion is easily deformed so as to be compressed in the vehicle width direction in a stable manner in a wide range in the front-rear direction.

The front-rear extended portion may be joined to the floor panel from below, and a lower face of the front-rear extended portion may be positioned above a lower face of the side sill.

With this configuration, the ridge portion formed between the lower face portion and the outer wall portion of the front-rear extended portion is positioned above the lower face of the inner wall portion of the side sill in the vehicle width direction, and hence the inner wall portion of the side sill is easily supported by the ridge portion having a high rigidity. The collision load is reliably transmitted to the bottom face portion from the side sill, and hence the bottom face portion is easily deformed so as to be compressed in the vehicle width direction in a stable manner. Therefore, when the collision load toward the vehicle-width-direction inner side acts on the side sill at the time of a side collision, the side sill is easily supported by the front-rear extended portion, and the inward falling deformation of the side sill is easily suppressed.

Meanwhile, when the lower face of the front-rear extended portion is positioned below the lower face of the side sill, the inner wall portion of the side sill is not supported by the abovementioned ridge portion, and the collision load is not efficiently transmitted to the lower face portion of the front-rear extended portion from the side sill. When the lower face of the front-rear extended portion is positioned at the same height as the lower face of the side sill, the inward falling deformation of the side sill easily occurs with the abovementioned ridge portion serving as the starting point.

The front-rear extended portion may include an outer wall portion extending toward the floor panel from a vehicle-width-direction outer end portion of the first face portion and may be joined the side sill at the outer wall portion.

With this configuration, the front-rear extended portion is joined to the side sill. Therefore, when the collision load toward the vehicle-width-direction inner side acts on the side sill at the time of a side collision, the front-rear extended portion resists the inward falling deformation of the side sill from the vehicle-width-direction inner side. Therefore, the inward falling deformation of the side sill is even more easily suppressed.

A compression strength of a portion of the floor panel that forms a closed cross-section together with the front-rear extended portion to the vehicle-width-direction inner side may be equivalent to a compression strength of the first face portion.

With this configuration, when a collision load toward the vehicle width direction is input to the front-rear extended portion via the side sill at the time of a side collision, the deformation amount of the first face portion becomes equivalent to the deformation amount of the portion of the floor panel that faces the first face portion. As a result, a misalignment of the inner-side flange with respect to the floor panel in the vehicle width direction does not occur. Therefore, a shearing strain according to the joined portion between the inner-side flange and the floor panel is not generated, and the joining in the inner-side flange can be maintained.

Advantageous Effects of Disclosure

According to some embodiments of the present disclosure, the joining of the front-rear extended portion to the floor panel may be easily maintained even at the time of a side collision, and hence the support effect for the side sill by the front-rear extended portion can be maintained.

BRIEF DESCRIPTION OF DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

MODE FOR CARRYING OUT THE DISCLOSURE

An embodiment of the present disclosure will be described below with reference to the accompanying drawings.

Figure 1:
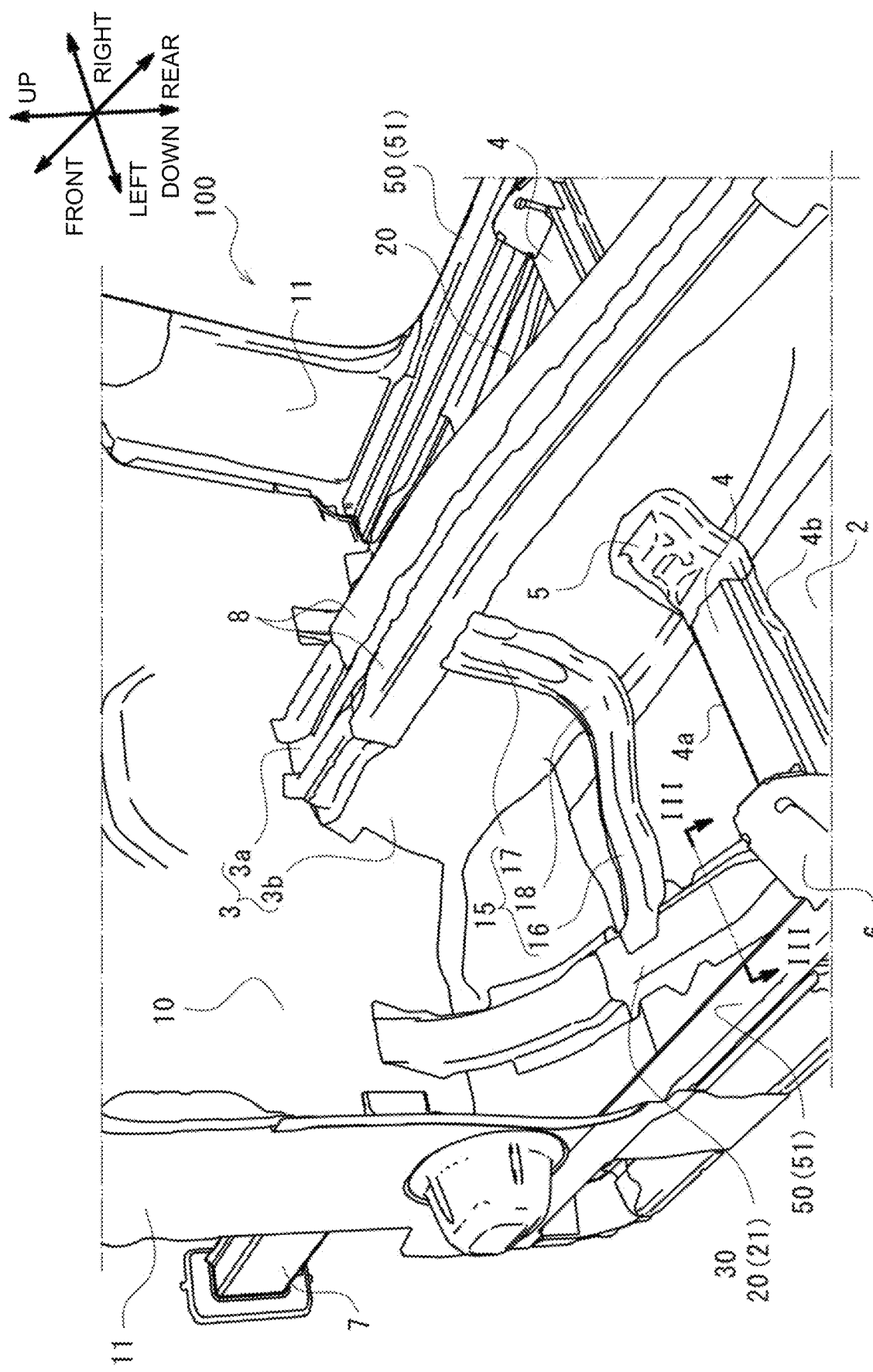
FIG. 1 is a perspective view of a lower vehicle-body structure of a vehicle according to one embodiment of the present disclosure.
Figure 2:
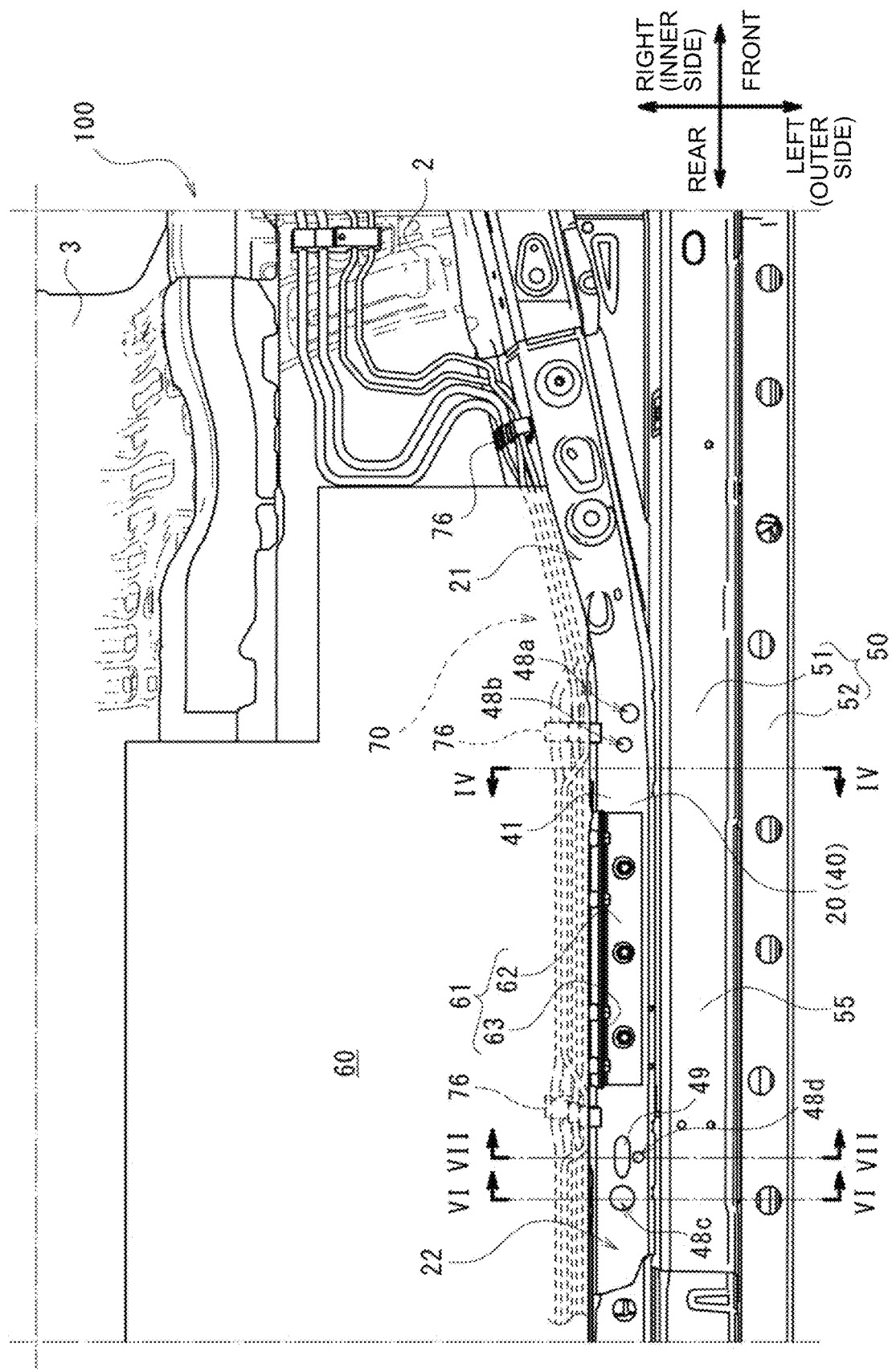
FIG. 2 is a bottom view of the lower vehicle-body structure of FIG. 1 according to one embodiment of the present disclosure.

FIG. 1 is a perspective view of a lower vehicle-body structure 100 of a vehicle according to one embodiment of the present disclosure. FIG. 2 is a bottom view of the left half side of the lower vehicle-body structure 100. In the description below, the front-rear direction, the vehicle width direction (left-right direction), and the up-down direction seen from an occupant riding the vehicle are referred to as the front-rear direction, the vehicle width direction (left-right direction), and the up-down direction of the lower vehicle-body structure 100 and each member.

As illustrated in FIG. 1, the lower vehicle-body structure 100 includes a floor panel 2 that constitutes a floor face portion of a space in a vehicle cabin, a pair of side sills 50 that extends in the front-rear direction along both vehicle-width-direction terminal ends of the floor panel 2, and a dash panel 10 disposed in front of the floor panel 2.

Each of the side sills 50 includes, on a cross-section orthogonal to the front-rear direction, a side sill inner 51 formed in a hat-like shape opened to the vehicle-width-direction outer side, and a side sill outer 52 (see FIG. 2) formed in a hat-like shape opened to the vehicle-width-direction inner side. The side sill inner 51 and the side sill outer 52 are joined to each other so as to form a closed cross-section continuous in the front-rear direction.

The lower vehicle-body structure 100 further includes a pair of hinge pillars 11 that rises upward from front end portions of the pair of side sills 50, respectively. A dash panel 10 is installed between the pair of hinge pillars 11. By the dash panel 10, the space in the vehicle cabin and an engine room are separated from each other in the front-rear direction. A pair of front frames 7 that extends in the front-rear direction is disposed on both side portions of the engine room in the vehicle width direction (only one of the front frames 7 is illustrated in FIG. 1).

On a vehicle-width-direction center portion of the lower vehicle-body structure 100, a tunnel portion 3 that bulges out upward from the floor panel 2 and extends in the front-rear direction is provided. The tunnel portion 3 is formed in a U-like shape opened downward in a cross-section orthogonal to the front-rear direction. Specifically, the tunnel portion 3 includes a top face portion 3a that extends in the front-rear direction and the vehicle width direction in the center in the vehicle width direction, and a pair of raised wall portions 3b that extends downward from both side portions of the top face portion 3a in the vehicle width direction and is connected to the floor panel 2.

Backbone frames 8 that extend in the front-rear direction are joined to both side portions of an upper portion of the tunnel portion 3 in the vehicle width direction, respectively. The backbone frames 8 are each formed in an L-shape so as to be joined along the top face portion 3a and the raised wall portions 3b of the tunnel portion 3 in a cross-section orthogonal to the front-rear direction. By the backbone frames 8, corner portions between the top face portion 3a and the raised wall portions 3b of the tunnel portion 3 are reinforced.

To an upper face of the floor panel 2, a pair of cross members 4 that extends in the vehicle width direction is joined. The pair of cross members 4 is provided on both side portions of the tunnel portion 3 in the vehicle width direction, respectively. The cross member 4 is a press-molded product made from a steel plate, for example, and is formed in a hat-like shape opened downward in a cross-section orthogonal to the vehicle width direction. The cross member 4 has, on a lower end portion, a front-side flange 4a that extends to the front side and a rear-side flange 4b that extends to the rear side.

The cross member 4 is joined to the floor panel 2 from above by spot welding, for example, at the front-side flange 4a and the rear-side flange 4b. Therefore, a closed cross-section (not shown) continuous in the vehicle width direction is formed between the cross member 4 and the floor panel 2.

In the cross member 4, an inner seat bracket 5 for supporting a front portion of an inner seat rail (not shown) is joined to an end portion on the vehicle-width-direction inner side, and an outer seat bracket 6 that supports a front portion of an outer seat rail (not shown) is joined to an end portion on the vehicle-width-direction outer side. The cross member 4 is coupled to the raised wall portion 3b of the tunnel portion 3 via the inner seat bracket 5 and is joined to the side sill inner 51 via the outer seat bracket 6.

A pair of frame members 20 that each extends between the side sill 50 and the tunnel portion 3 in the front-rear direction is joined to the floor panel 2. The pair of frame members 20 is provided on both sides of the tunnel portion 3 in the vehicle width direction, respectively. Each of the frame members 20 has an inclined portion 21 that extends in a direction inclined to the vehicle-width-direction outer side toward the rear side, and a front-rear extended portion 22 (see FIG. 2) that is continuous with a rear portion of the inclined portion 21 and extends to the rear side in parallel to the front-rear direction.

The inclined portion 21 has a front end portion that is continuous with a rear end portion of the front frame 7, and a rear end portion that terminates at an outer end portion of the cross member 4 in the vehicle width direction. The front-rear extended portion 22 is in abutment against the vehicle-width-direction inner side of the side sill inner 51.

A pair of coupling members or couplers 15 that couples the pair of frame members 20, specifically, the pair of inclined portions 21, to the pair of raised wall portions 3b of the tunnel portion 3, respectively, in the vehicle width direction is joined to the upper face of the floor panel 2. The pair of coupling members 15 is provided on both sides of the tunnel portion 3 in the vehicle width direction (only one of the coupling members 15 is illustrated in FIG. 1).

Each of the coupling members 15 has a horizontal portion 16 that extends in the vehicle width direction along the floor panel, a rising portion 17 that extends upward along the raised wall portion 3b of the tunnel portion 3, and a slope portion 18 that connects the horizontal portion 16 and the rising portion 17 to each other. The horizontal portion 16 extends in a direction substantially orthogonal to the extending direction of the inclined portion 21 in top view. The slope portion 18 extends in a direction that is inclined upward toward the vehicle-width-direction inner side in a manner of being separated from the floor panel 2 and the raised wall portion 3b of the tunnel portion 3.

The coupling member 15 is a press-molded product made from a steel plate, for example, and has a cross-sectional shape orthogonal to the extending direction that is formed in a hat-like shape opened downward or to the vehicle-width-direction inner side.

The horizontal portion 16 of the coupling member 15 is joined to the inclined portion 21 at an outer end portion in the vehicle width direction and forms a closed cross-section that extends in the vehicle width direction between the horizontal portion 16 and the floor panel 2. The rising portion 17 of the coupling member 15 is joined to the raised wall portion 3b of the tunnel portion 3 and forms a closed cross-section that extends in the up-down direction together with the raised wall portion 3b. An upper end portion of the rising portion 17 is joined to the backbone frame 8. The slope portion 18 of the coupling member 15 is not joined to either the floor panel 2 or the tunnel portion 3.

Figure 3:
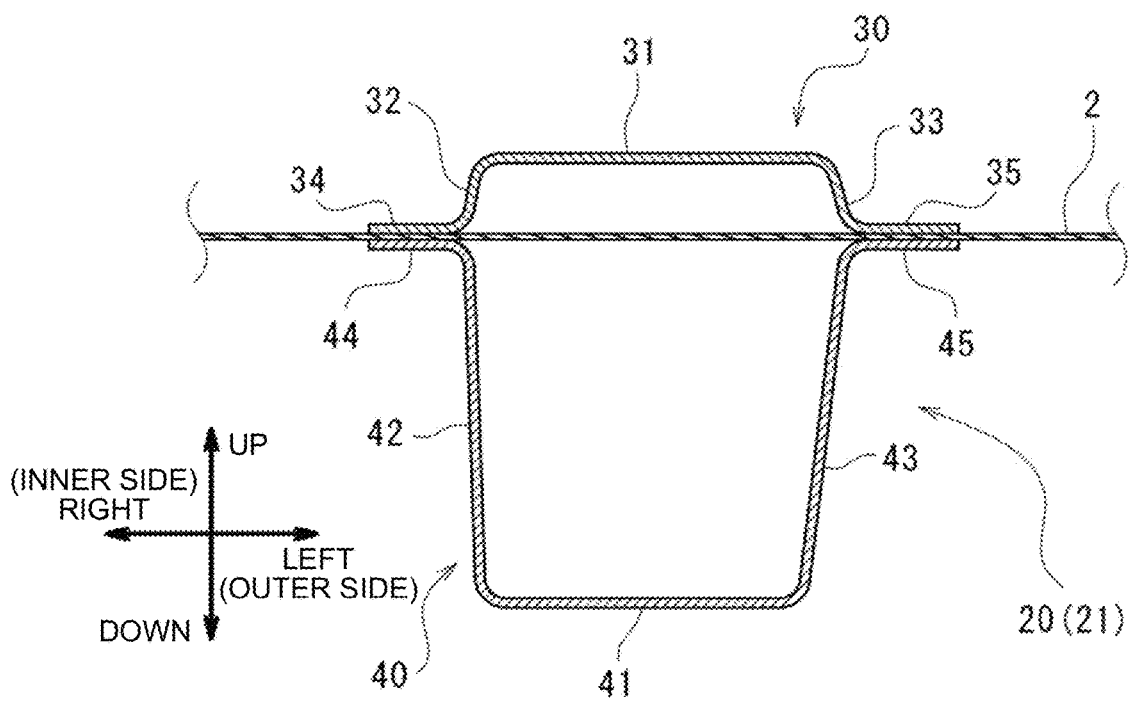
FIG. 3 is a cross-sectional view taken along line of FIG. 1 according to one embodiment of the present disclosure.

FIG. 3 is a cross-sectional view orthogonal to the front-rear direction in the inclined portion 21 of the frame member 20 taken along line of FIG. 1. As illustrated in FIG. 3, the frame member 20 has an upper frame 30 joined to the upper face of the floor panel 2, and a lower frame 40 joined to a lower face of the floor panel 2. In the inclined portion 21, the upper frame 30 and the lower frame 40 are disposed so as to face each other on the upper side and the lower side over the floor panel 2.

In the present embodiment, the inclined portion 21 is composed of the upper frame 30 and a portion of the lower frame 40 that is positioned on the front side of the cross member 4. The front-rear extended portion 22 is composed of a portion of the lower frame 40 that is positioned behind the cross member 4 and that includes a portion that faces the cross member 4 in the front-rear direction from below. The upper frame 30 and the lower frame 40 are press-molded products made from steel plates, for example.

The upper frame 30 is formed in a hat-like shape opened downward in the cross-section illustrated in FIG. 3. Specifically, the upper frame 30 has an upper face portion 31 that extends to be substantially parallel to the floor panel 2 on the upper face side of the floor panel 2, an inner wall portion 32 that extends downward from a vehicle-width-direction inner end portion of the upper face portion 31, an outer wall portion 33 that extends downward from a vehicle-width-direction outer end portion of the upper face portion 31, an inner-side flange 34 that extends to the vehicle-width-direction inner side from a lower end portion of the inner wall portion 32, and an outer-side flange 35 that extends to the vehicle-width-direction outer side from a lower end portion of the outer wall portion 33.

The lower frame 40 is formed in a hat-like shape opened to upward in the cross-section illustrated in FIG. 3. Specifically, the lower frame 40 has a bottom face portion 41 (first face portion) that extends to be substantially parallel to the floor panel 2 on the lower face side of the floor panel 2, an inner wall portion 42 that extends upward from a vehicle-width-direction inner end portion of the bottom face portion 41, an outer wall portion 43 that extends upward from a vehicle-width-direction outer end portion of the bottom face portion 41, an inner-side flange 44 that extends to the vehicle-width-direction inner side from an upper end portion of the inner wall portion 42, and an outer-side flange 45 that extends to the vehicle-width-direction outer side from a lower end portion of the outer wall portion 43.

In the upper frame 30 and the lower frame 40, the inner-side flanges 34, 44 thereof are joined to each other and the outer-side flanges 35, 45 thereof are joined to each other by spot welding, for example, over the floor panel 2 interposed therebetween such that the three parts are overlapped with one another. Therefore, in the inclined portion 21, the upper frame 30 and the lower frame 40 forms a substantially rectangular closed cross-section that extends in the front-rear direction such that the floor panel 2 is interposed between the upper frame 30 and the lower frame 40 from the upper side and the lower side.

As illustrated in FIG. 2, a battery 60 and a plurality of pipes 70 are disposed below the floor panel 2 as vehicle components according to one embodiment of the present disclosure. The battery 60 is disposed between the lower frame 40 and the tunnel portion 3 in the vehicle width direction. The battery 60 has an outer end portion in the vehicle width direction that is fixed to the bottom face portion 41 of the lower frame 40 via a battery bracket 61 by fastening, and an inner end portion in the vehicle width direction that is fixed to a bracket (not shown) provided on the floor panel 2 and/or the tunnel portion 3 by fastening.

The battery bracket 61 is formed in an L-like shape having a first face portion 62 that extends in the front-rear direction to be parallel to the bottom face portion 41 of the lower frame 40, and a second face portion 63 that extends downward from an inner end portion of the first face portion 62 in the vehicle width direction.

The first face portion 62 is fixed to the bottom face portion 41 of the lower frame 40 from below by fastening. The battery 60 has an outer-side end portion in the vehicle width direction that is fixed to the second face portion 63 from the vehicle-width-direction outer side by fastening. Therefore, the battery 60 is fixed, at the outer-side end portion in the vehicle width direction, to the bottom face portion 41 of the lower frame 40 via the battery bracket 61.

The plurality of pipes 70 extend in the front-rear direction along the inner wall portion 42 of the lower frame 40. The plurality of pipes 70 are routed in a position above a vehicle-width-direction outer end portion of the battery 60 and adjacent to the inner side of the inner wall portion 42 of the lower frame 40 in the vehicle width direction.

Figure 4:
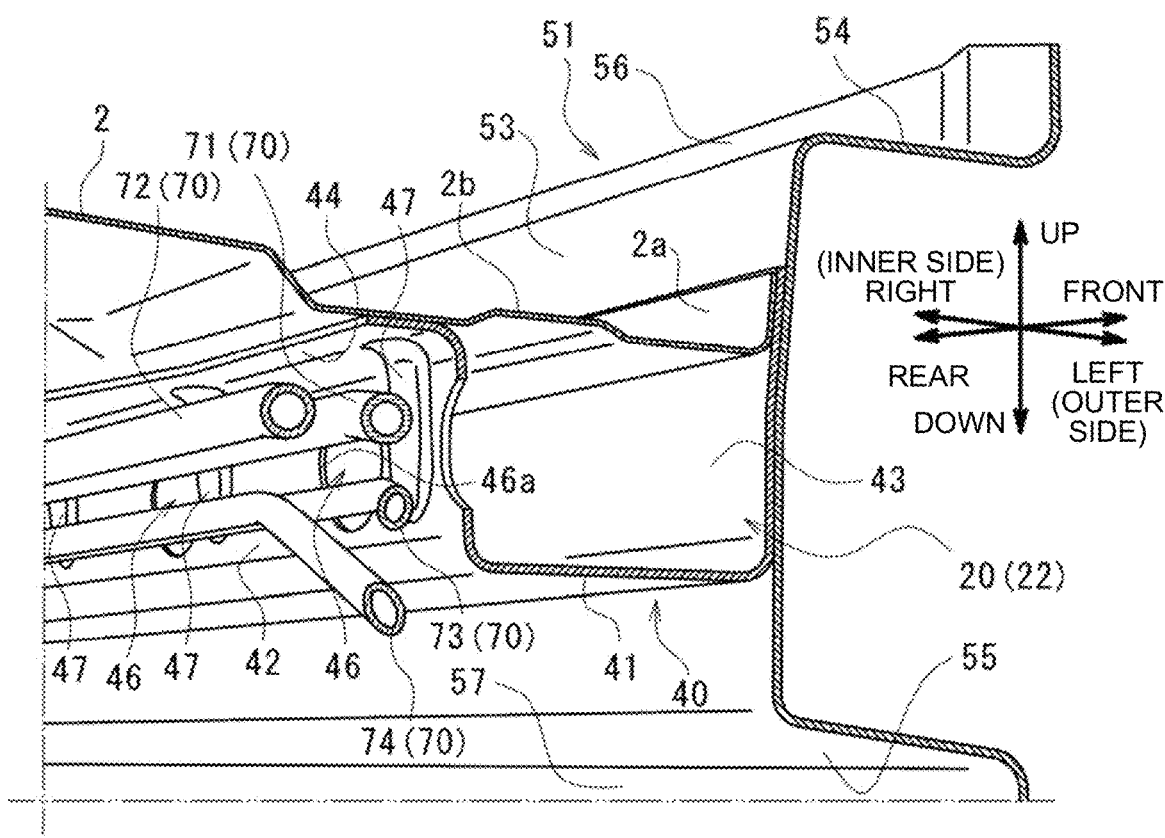
FIG. 4 is a cross-sectional view taken along line IV-IV of FIG. 2 according to one embodiment of the present disclosure.

FIG. 4 is a perspective view illustrating a cross-section orthogonal to the front-rear direction of the front-rear extended portion 22 of the frame member 20 taken along line IV-IV of FIG. 2. In FIG. 4, the battery 60 and the side sill outer 52 are omitted. As illustrated in FIG. 4, the plurality of pipes 70 include a first fuel pipe 71, a second fuel pipe 72, a first brake pipe 73, and a second brake pipe 74.

The first fuel pipe 71 is a pipe for supplying fuel to an engine (not shown) from a fuel tank (not shown). The second fuel pipe 72 is a pipe for introducing transpiration gas generated in the fuel tank to a canister (not shown), for example. The first brake pipes 73 and the second brake pipes 74 are pipes for transmitting operating oil pressure to brake apparatuses (not shown) for left and right rear wheels, respectively.

Figure 5:
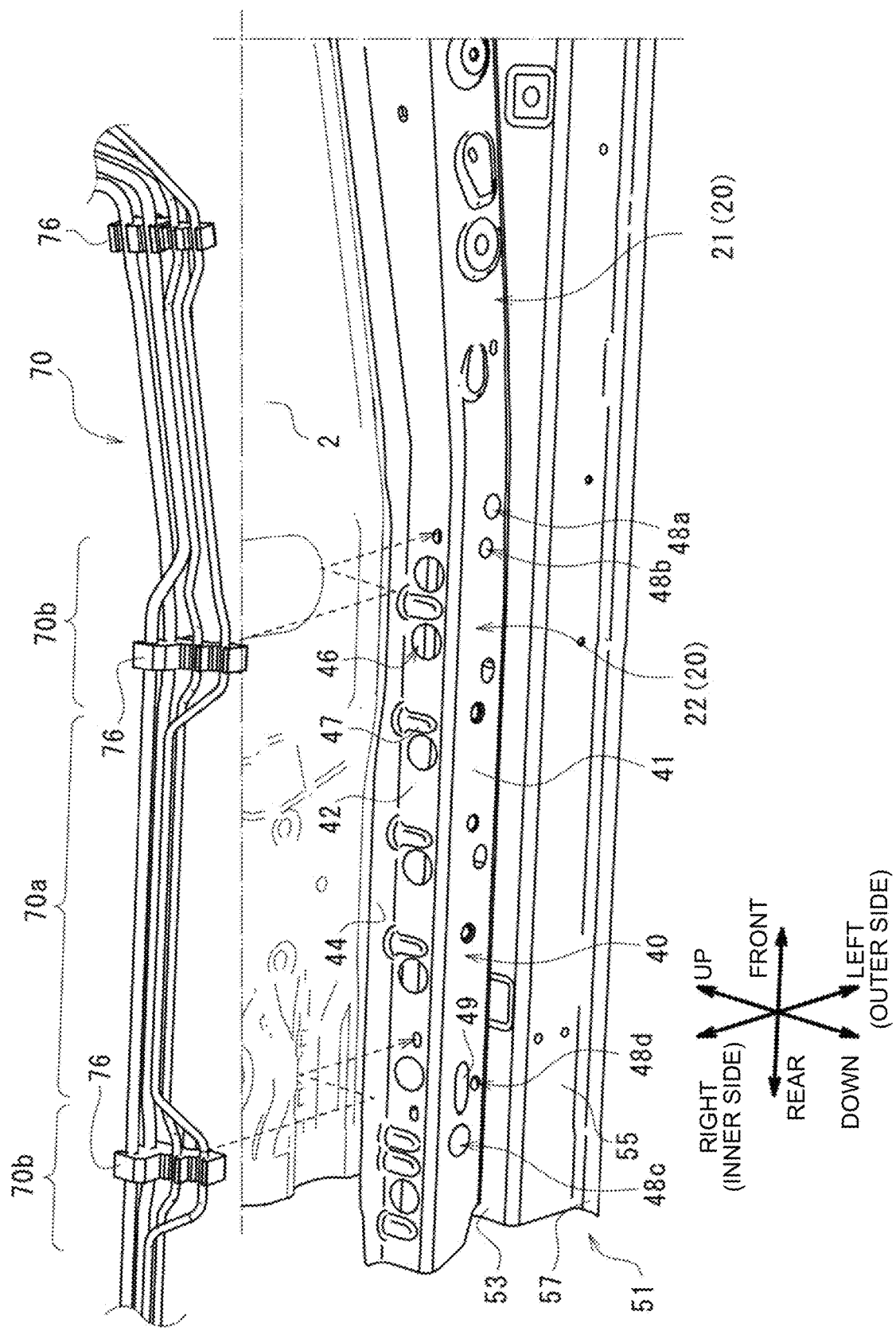
FIG. 5 is a perspective view of the periphery of a lower frame seen from below according to one embodiment of the present disclosure.

FIG. 5 is a perspective view of the periphery of the lower frame 40 seen from below. In FIG. 5, the battery 60 is omitted and a state in which the plurality of pipes 70 are disassembled is illustrated. As illustrated in FIG. 5, the plurality of pipes 70 are mounted on the inner wall portion 42 of the lower frame 40 via pipe clips 76 at a plurality of sections spaced apart from each other in the front-rear direction. In the present embodiment, the plurality of pipes 70 are mounted on the lower frame 40 via the pipe clips 76 at two sections, each of which is a portion close to the front side of the front-rear extended portion 22 and a portion close to the rear side thereof.

Figure 6:
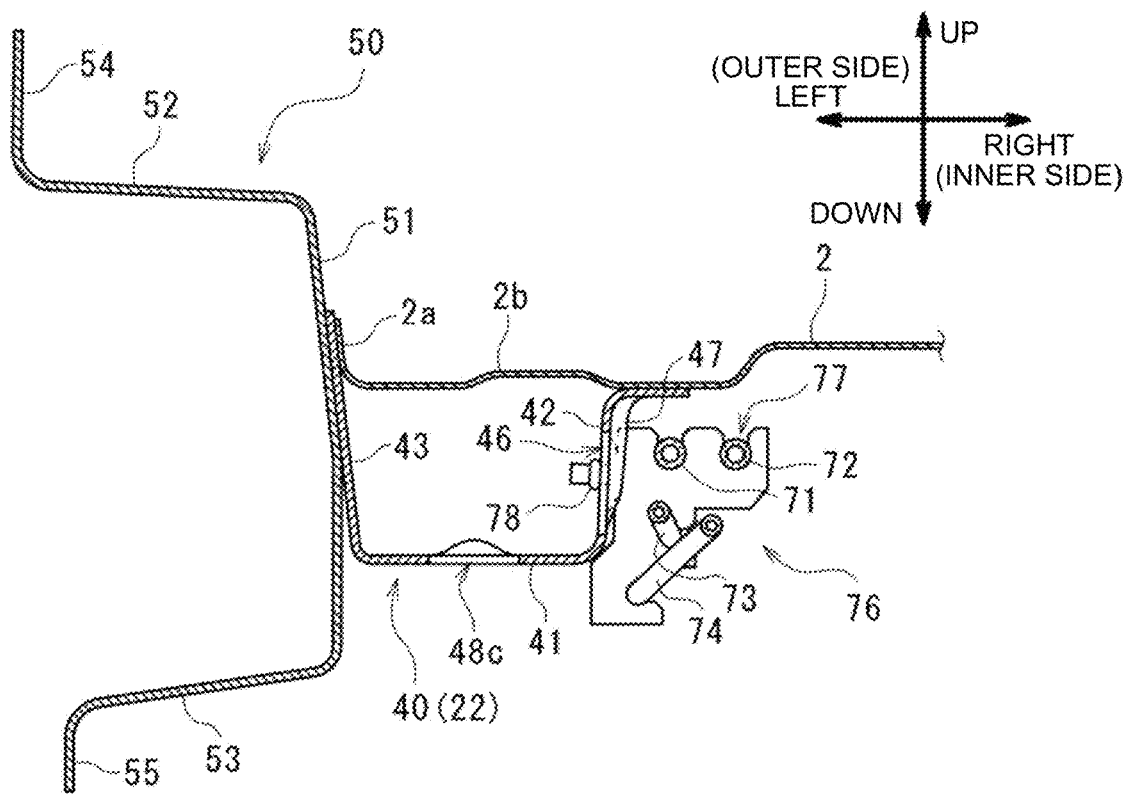
FIG. 6 is a cross-sectional view taken along line VI-VI of FIG. 2 according to one embodiment of the present disclosure.

With reference to FIG. 6 as well, the pipe clip 76 has a plurality of holding portions 77 that individually hold the plurality of pipes 70, and a mounting portion 78 mounted to the inner wall portion 42 of the lower frame 40. The plurality of pipes 70 each have a straight pipe portion 70a and a portion to be held 70b, the straight pipe portions 70a extending linearly in parallel with each other in the front-rear direction and in an adjacent manner to the lower frame 40 on the vehicle-width-direction inner side of the lower frame 40, the portions to be held 70b being bent from the straight pipe portion 70a and held by the corresponding holding portion 77 of the pipe clip 76.

As illustrated in FIG. 4, the floor panel 2 has an outer-side flange 2a that extends upward from an outer end portion in the vehicle width direction. The side sill inner 51 has an inner wall portion 53 that extends in the up-down direction on the vehicle-width-direction inner side, an upper face portion 54 that extends to the vehicle-width-direction outer side from an upper end portion of the inner wall portion 53, a lower face portion 55 that extends to the vehicle-width-direction outer side from a lower end portion of the inner wall portion 53, an upper-side flange 56 that extends upward from an outer end portion of the upper face portion 54 in the vehicle width direction, and a lower-side flange 57 that extends downward from an outer end portion of the lower face portion 55 in the vehicle width direction.

The inner wall portion 53 extends in the up-down direction across the floor panel 2 from the lower face side to the upper face side. Specifically, the center position of the inner wall portion 53 in the up-down direction is positioned below the floor panel 2. The side sill inner 51 is joined to the side sill outer 52 (see FIG. 2) by the upper-side flange 56 and the lower-side flange 57.

As with the inclined portion 21, the lower frame 40 also has the bottom face portion 41, the inner wall portion 42, the outer wall portion 43, and the inner-side flange 44 in the front-rear extended portion 22. The bottom face portion 41 is positioned above the lower face portion 55 of the side sill inner 51.

Meanwhile, the lower frame 40, unlike the inclined portion 21, does not have the outer-side flange 45 in the front-rear extended portion 22, and the outer wall portion 43 extends upward beyond the floor panel 2. The outer wall portion 43 is joined to the inner wall portion 53 of the side sill inner 51 by spot welding. Specifically, the lower frame 40 is joined to the inner wall portion 53 of the side sill inner 51 at a place below the center position of the outer wall portion 43 in the up-down direction.

The lower frame 40 is joined, at an upper end portion of the outer wall portion 43, to the inner wall portion 53 of the side sill inner 51 together with the outer-side flange 2a of the floor panel 2 by spot welding, for example, such that the three parts are overlapped with one another. In other words, the lower frame 40 is joined, in the outer wall portion 43, to the inner wall portion 53 of the side sill inner 51 at two sections spaced apart from each other to the upper side and the lower side on the upper face side and the lower face side of the floor panel 2.

As illustrated in FIG. 5, a plurality of horizontal holes 46 that pass through the inner wall portion 42 of the lower frame 40 in the vehicle width direction are formed in the inner wall portion 42. The plurality of horizontal holes 46 are used to insert a tool for spot welding when the outer wall portion 43 (see FIG. 4) of the lower frame 40 is joined to the inner wall portion 53 (see FIG. 4) of the side sill inner 51 on the inner side of the closed cross-section by spot welding. The plurality of horizontal holes 46 are formed so as to correspond to positions at which the lower frame 40 is joined to the side sill inner 51 by spot welding.

In the present embodiment, the horizontal holes 46 are composed of round holes, but various hole shapes such as rectangular shapes may be employed other than the round holes.

A high-rigidity portion that increases the rigidity so as to suppress the out-of-plane deformation of the inner wall portion 42 of the lower frame 40 is formed on the inner wall portion 42. In the present embodiment, the high-rigidity portion is composed of a plurality of ribs 47 that extend in the up-down direction.

The plurality of ribs 47 are formed so as to be convex to the vehicle-width-direction inner side from the inner wall portion 42. The plurality of ribs 47 extend roughly over the range in which the horizontal holes 46 are formed in the up-down direction and upper end portions thereof reach the inner-side flange 44. The plurality of ribs 47 are positioned to be adjacent to the plurality of horizontal holes 46 in the front-rear direction, respectively. For example, the interval between the horizontal hole 46 and the rib 47 in the front-rear direction is set to be 10 mm or less.

The ribs 47 are formed in positions different from the positions in which the pipe clips 76 are mounted in the front-rear direction. In the present embodiment, the ribs 47 are formed between a pair of the pipe clips 76 mounted on a front portion and a rear portion of the front-rear extended portion 22 and on the rear side of the pipe clip 76 provided on the rear portion.

The inner wall portion 42 has the plurality of horizontal holes 46 formed therein, and hence the surface rigidity of the inner wall portion 42 is easily reduced. However, according to the present embodiment, the surface rigidity in places around the horizontal holes 47 is enhanced by the ribs 47. In particular, the ribs 47 extend in the up-down direction, and hence the ribs 47 act so as to suitably resist, in particular, an out-of-plane deformation along a breakage line that extends in the front-rear direction among out-of-plane deformations of the inner wall portion 42.

As illustrated in FIG. 5, the horizontal holes 46 and the ribs 47 are positioned so as to face the straight pipe portions 70a of the plurality of pipes 70 in the vehicle width direction. In the present embodiment, the ribs 47 face all of the plurality of pipes 70 in the vehicle width direction. However, the ribs 47 only need to at least partially face some of those pipes 70.

As illustrated in FIG. 2, in the bottom face portion 41 of the lower frame 40, a plurality of vertical holes 48 that pass through the bottom face portion 41 in the up-down direction and a recess 49 (bead) provided so as to be recessed upward are formed at positions shifted from the battery bracket 61 in the front-rear direction. In the present embodiment, in the front-rear extended portion 22, a first vertical holes 48a and a second vertical hole 48b are formed so as to be disposed side by side in the front-rear direction on the front side of the battery bracket 61 of the bottom face portion 41, and the recess 49 and a third vertical hole 48c are formed so as to be disposed side by side in the front-rear direction on the rear side of the battery bracket 61 in the bottom face portion 41. A fourth vertical hole 48d is formed to be adjacent to the vehicle-width-direction outer side of the recess 49.

FIG. 6 is a cross-sectional view orthogonal to the front-rear direction of the periphery of the lower frame 40, which is taken along line VI-VI of FIG. 2. Specifically, FIG. 6 is a cross-sectional view that passes through the center of the third vertical hole 48c. As illustrated in FIG. 6, the third vertical hole 48c passes through the bottom face portion 41 in the up-down direction.

Figure 7:
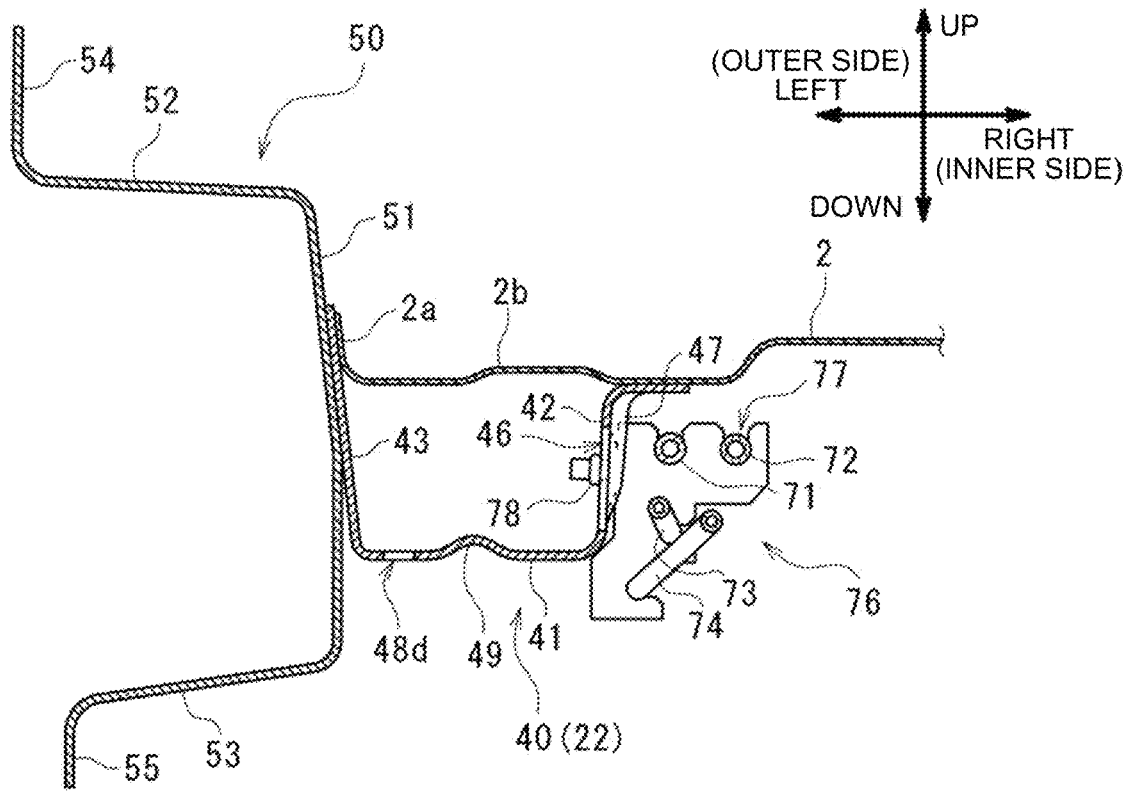
FIG. 7 is a cross-sectional view taken along line VII-VII of FIG. 2 according to one embodiment of the present disclosure.

FIG. 7 is a cross-sectional view orthogonal to the front-rear direction of the periphery of the lower frame 40, which is taken along line VII-VII of FIG. 2. Specifically, FIG. 7 is a cross-sectional view that passes through the center of the recess 49 and a fourth hole 49d. As illustrated in FIG. 7, the recess 49 is provided to be recessed upward from the bottom face portion 41 and protrudes to the inner side of the closed cross-section. With reference to FIG. 2 as well, the recess 49 extends in the front-rear direction. The fourth vertical hole 48d passes through the bottom face portion 41 in the up-down direction and has a smaller diameter than those of the first to third vertical holes 41a to 41c.

In the present embodiment, the floor panel 2 is made of a steel plate having a tensile strength of 590 MPa and a plate thickness of 0.8 mm, while the lower frame 40 is made of a steel plate having a tensile strength of 780 MPa and a plate thickness of 1.4 mm. In other words, in the closed cross-section formed by the floor panel 2 and the lower frame 40, the bottom face portion 41 of the lower frame 40 has a higher tensile strength and a thicker plate thickness than a facing face portion 2b of the floor panel 2 that faces the bottom face portion 41. Therefore, according to this configuration, the bottom face portion 41 tends to have a higher compression rigidity than that of the facing face portion 2b.

However, in the present embodiment, the plurality of vertical holes 48 and the recess 49 are formed in the bottom face portion 41 of the lower frame 40, and hence the compression rigidity in the vehicle width direction is reduced. In other words, the surface rigidity of the bottom face portion 41 is reduced by the plurality of vertical holes 48, and the recess 49 acts as a starting point of the breakage that extends in the front-rear direction when a load in the vehicle width direction is received. Therefore, the compression rigidity of the bottom face portion 41 is reduced. In other words, the vertical holes 48 and the recess 49 constitute a deformation facilitating portion according to some embodiments of the present disclosure.

As a result, the compression rigidity in the bottom face portion 41 of the lower frame 40 in the vehicle width direction becomes closer to the compression rigidity in the facing face portion 2b of the floor panel 2 in the vehicle width direction.

Next, with reference to FIG. 8 to FIG. 12, a variant of the lower vehicle-body structure 100 when a side collision load due to a side collision to a pole is input to the side sill 50 is described.

Figure 8:
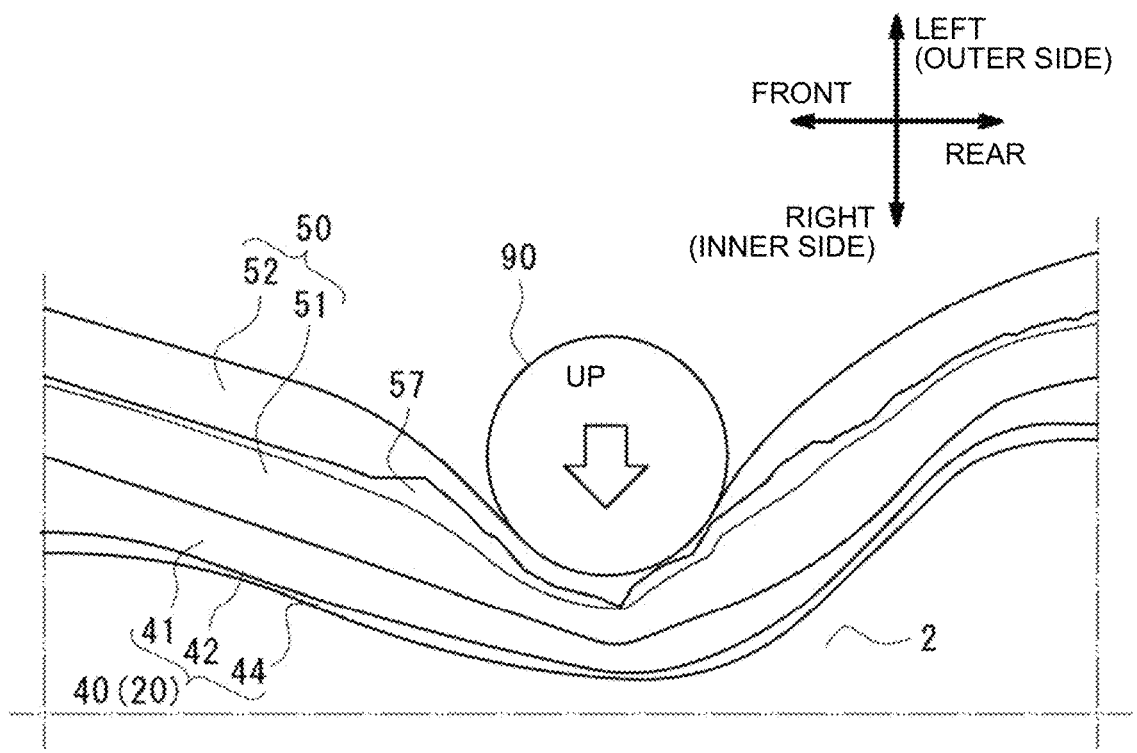
FIG. 8 is a bottom view of the periphery of the lower frame illustrating an analysis result at the time of a side collision to a pole according to one embodiment of the present disclosure.
Figure 9:
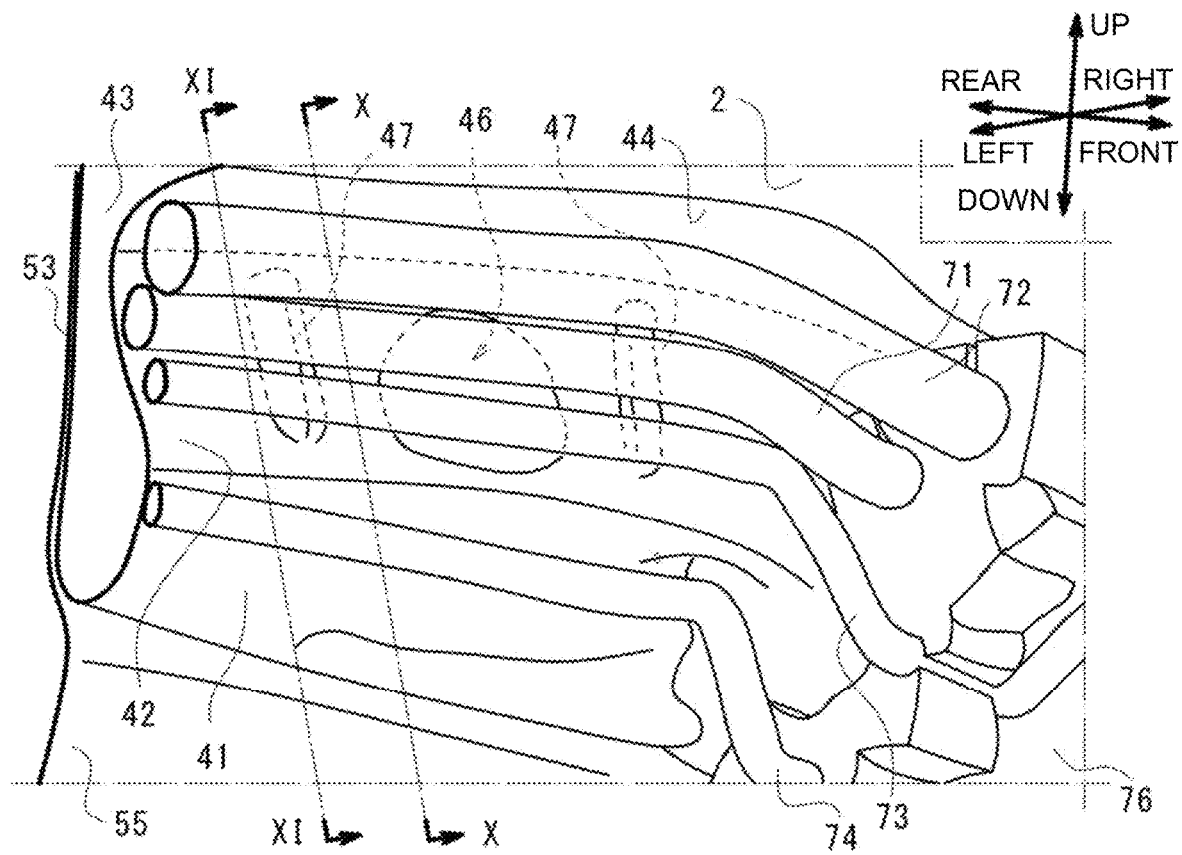
FIG. 9 is a perspective view of the analysis result of FIG. 8 seen from the vehicle-width-direction inner side according to one embodiment of the present disclosure.

FIG. 8 is a bottom view illustrating the variant of the lower vehicle-body structure 100 at the time of a side collision to a pole calculated by CAE analysis, and FIG. 9 is a perspective view of a deformed section in FIG. 8 seen from the vehicle-width-direction inner side.

As illustrated in FIG. 8 and FIG. 9, in the CAE analysis, the variant of the lower vehicle-body structure 100 when a pole 90 collides against the front-rear extended portion 22 of the frame member 20 from the vehicle-width-direction outer side is calculated. As illustrated in FIG. 8, the pole 90 penetrates into the vehicle-width-direction inner side. As a result, both of the side sill 50 and the frame member 20 are locally pushed into the vehicle-width-direction inner side.

Figure 10:
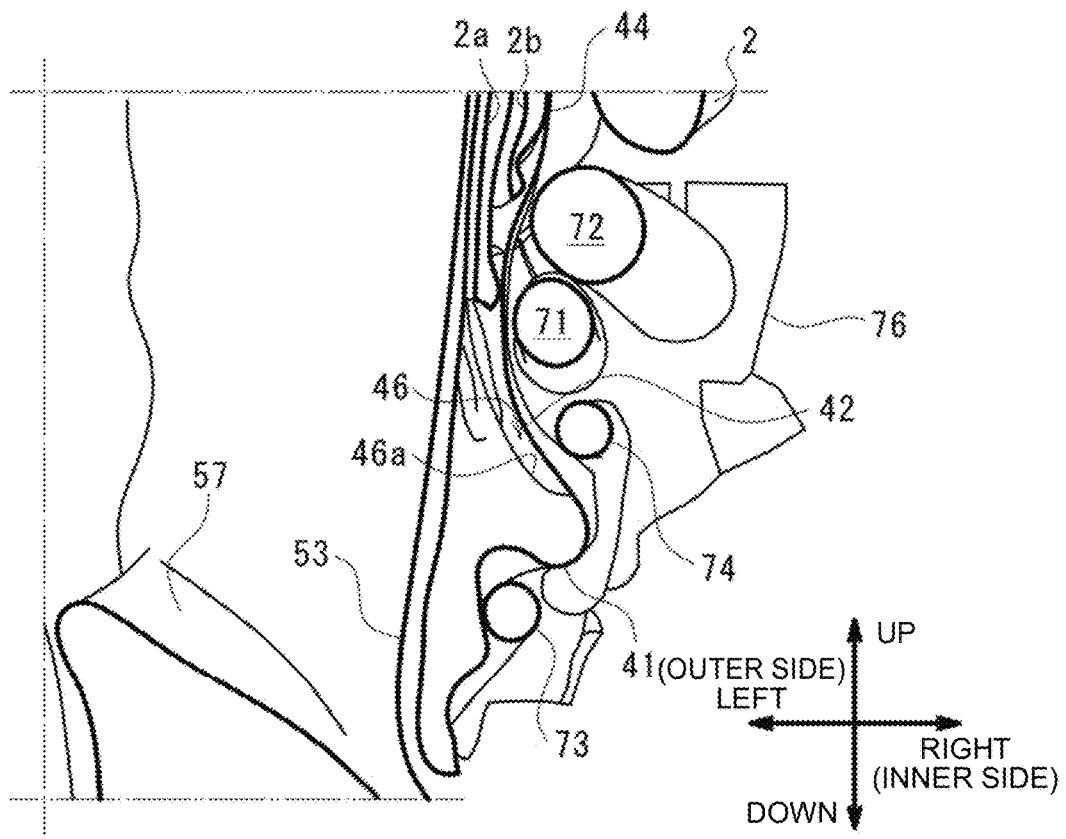
FIG. 10 is a cross-sectional view taken along line X-X of FIG. 9 according to one embodiment of the present disclosure.

FIG. 10 is a cross-sectional view orthogonal to the front-rear direction, which is taken along line X-X of FIG. 9. Specifically, FIG. 10 is a cross-sectional view of the vicinity of the horizontal hole 46. As illustrated in FIG. 10, by the side collision to a pole, the lower frame 40 is deformed such that the inner wall portion 42 protrudes to the vehicle-width-direction inner side. However, by the ribs 47, the protrusion amount of the inner wall portion 42 to the vehicle-width-direction inner side due to the out-of-plane deformation is suppressed. As a result, the protrusion of edge portions 46a of the horizontal holes 46 to the vehicle-width-direction edge side is suppressed, and the contact between the edge portions 46a and the plurality of pipes 70 is avoided. Therefore, the damage of the pipes 70 caused by the edge portions 46a of the horizontal holes 46 at the time of a side collision to a pole is suppressed.

Figure 11:
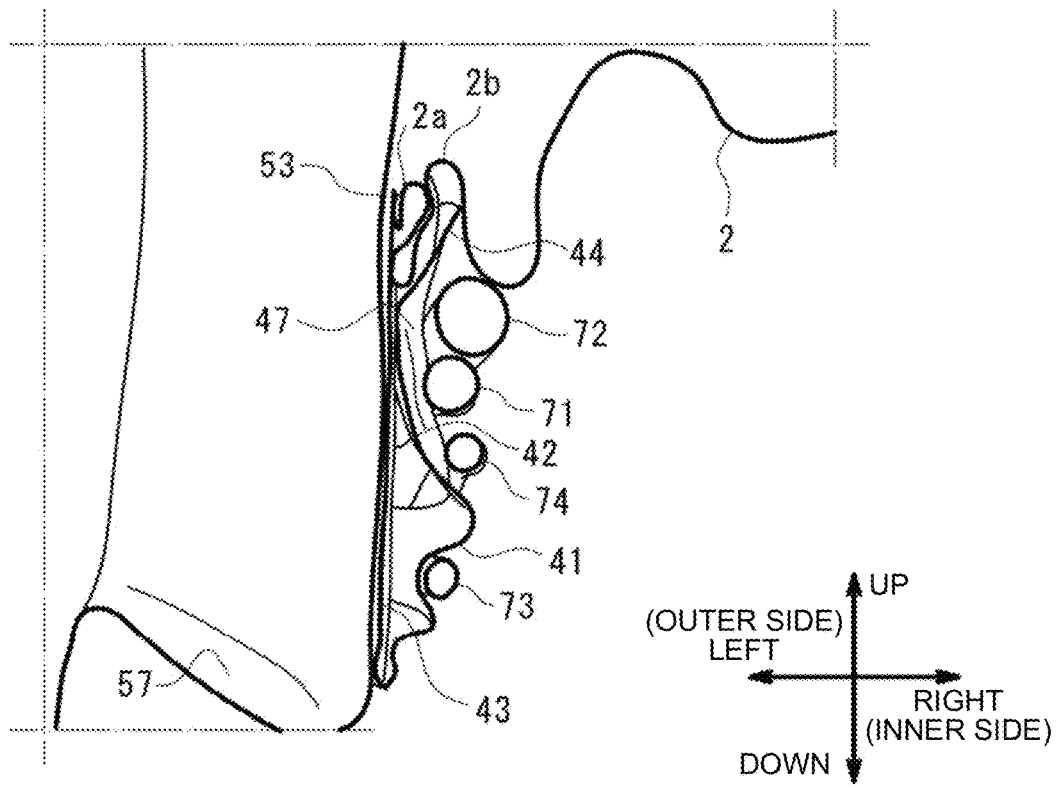
FIG. 11 is a cross-sectional view taken along line XI-XI of FIG. 9 according to one embodiment of the present disclosure.

FIG. 11 is a cross-sectional view orthogonal to the front-rear direction, which is taken along line XI-XI of FIG. 9. Specifically, FIG. 11 is a cross-sectional view of the vicinity of the rib 47. As illustrated in FIG. 11, at the time of a side collision to a pole, the plurality of pipes 70 come into contact with the ribs 47 before coming into contact with the inner wall portion 42, and hence the contact of the plurality of pipes 70 with the edge portions 46a of the horizontal holes 46 is also suppressed.

Figure 14:
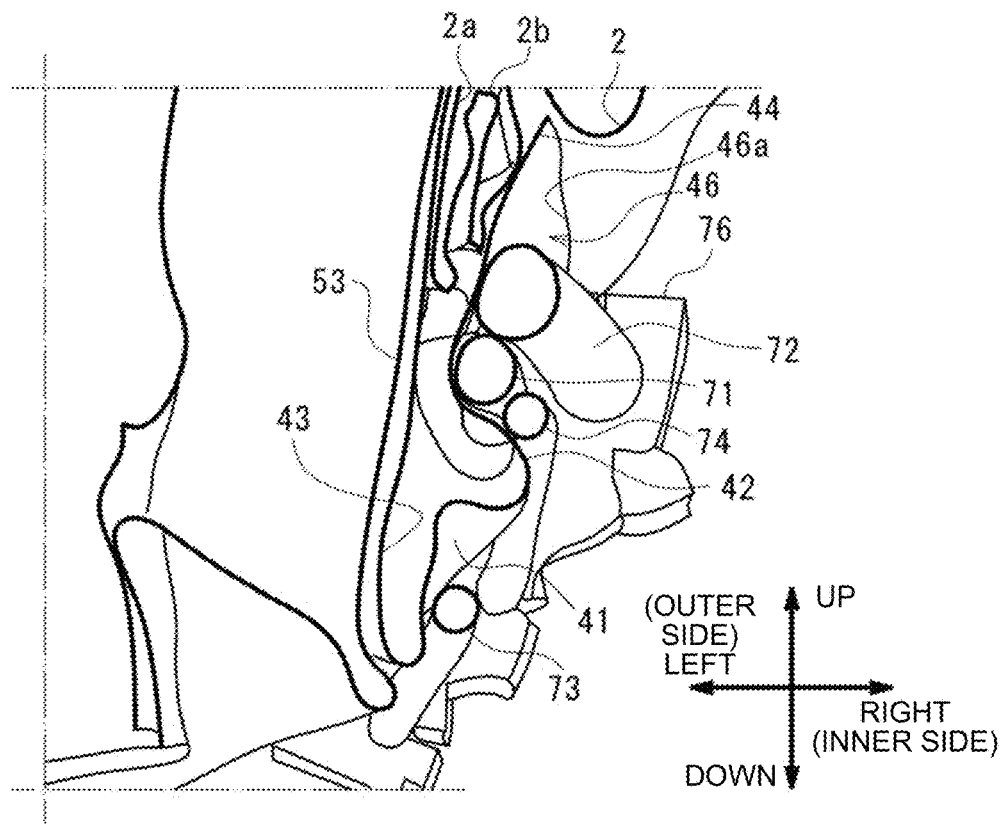
FIG. 14 is a cross-sectional view, similar to FIG. 10, illustrating a variant of a lower frame according to a comparative example.

FIG. 14 illustrates a CAE analysis result at the same cross-section position as FIG. 10 in a comparative example in which the ribs 47 are not formed in the inner wall portion 42. As illustrated in FIG. 14, in the comparative example, as compared to the present embodiment, the out-of-plane deformation of the inner wall portion 42 to the vehicle-width-direction inner side is larger. Further, in the comparative example, the ribs 47 are not formed on the inner wall portion 42. Therefore, the ribs 47 cannot be caused to hit the pipes 70 first prior to the edge portions 46a of the horizontal holes 46. As a result, the edge portions 46a of the horizontal holes 46 are in contact with the plurality of pipes 70 at the time of a side collision to a pole.

Figure 12:
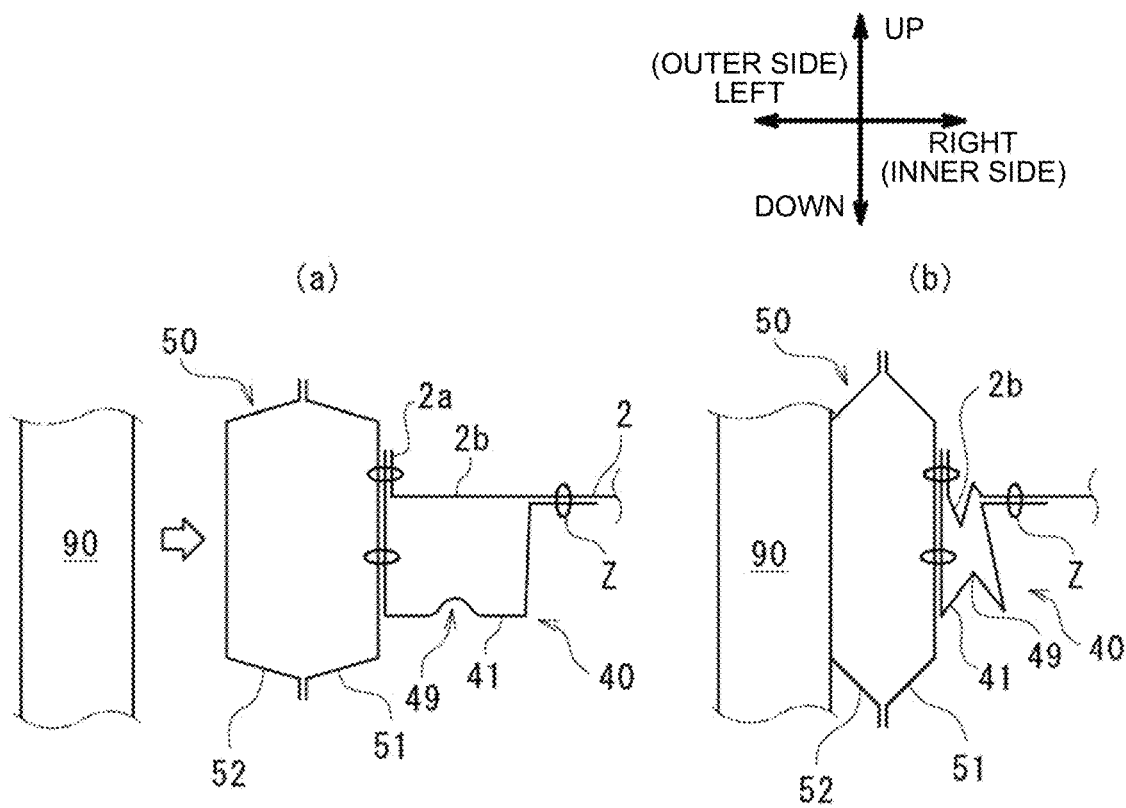
FIG. 12 is a view schematically illustrating a variant of the periphery of the lower frame at the time of a side collision according to one embodiment of the present disclosure.

FIG. 12 is a view schematically illustrating a variant of the periphery of the lower frame 40 at the time of a side collision to a pole. As illustrated in FIG. 12(*a*), the recess 49 is formed in the bottom face portion 41 of the lower frame 40. Therefore, as illustrated in FIG. 12(*b*), in the lower frame 40, the bottom face portion 41 easily bends upward at the time of a side collision to a pole with the recess 49 serving as a starting point.

Although illustration is omitted, the vertical holes 48 reduce the rigidity of the bottom face portion 41, and hence the vertical holes 48 also act to decrease the compression strength of the bottom face portion 41 in the vehicle width direction as with the recess 49.

As a result, the deformation amount (compression amount) of the bottom face portion 41 of the lower frame 40 in the vehicle width direction becomes closer to the deformation amount (compression amount) of the facing face portion 2b of the floor panel 2 in the vehicle width direction. Therefore, the shearing strain in the vehicle width direction generated in a joined portion Z that is joined to the floor panel 2 in the inner-side flange 44 is reduced. Therefore, also in the pole collision, the joining in the joined portion Z is easily maintained. As a result, the removal of the joining in the joined portion Z is avoided, and hence the support for the side sill 50 by the lower frame 40 from the vehicle-width-direction inner side is easily maintained.

Figure 15:
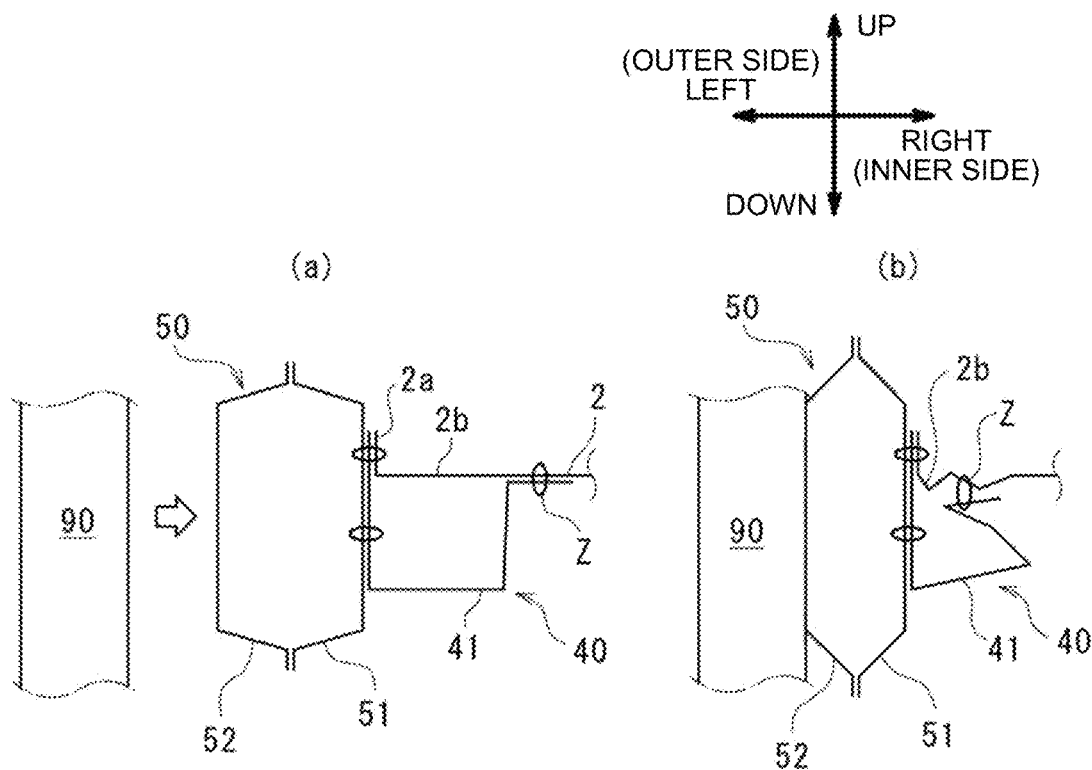
FIG. 15 is a cross-sectional view, similar to FIG. 12, illustrating a variant of a lower frame according to a comparative example.

FIG. 15 is a view that is similar to FIG. 12 and is schematically illustrating a variant of the periphery of the lower frame 40 at the time of a side collision to a pole in a further comparative example in which neither the vertical hole 48 nor the recess 49 is formed in the bottom face portion 41. As illustrated in FIG. 15(*a*), neither the vertical hole 48 nor the recess 49 is formed in the bottom face portion 41 of the lower frame 40. Therefore, as illustrated in FIG. 15(*b*), in the lower frame 40, the bottom face portion 41 is not likely to be deformed so as to be compressed in the vehicle width direction at the time of a side collision to a pole.

In this case, the deformation amount (compression amount) of the bottom face portion 41 of the lower frame 40 in the vehicle width direction does not become closer to the deformation amount (compression amount) of the facing face portion 2*b* of the floor panel 2 in the vehicle width direction. Therefore, the shearing strain generated in the joined portion Z in the inner-side flange 44 that is joined to the floor panel 2 increases. As a result, the joining in the joined portion Z is easily removed, and the support for the side sill 50 by the lower frame 40 from the vehicle-width-direction inner side is not likely to be maintained.

According to the lower vehicle-body structure 100 according to the embodiment described above, the following effects are exhibited.

(1) When the collision load in the vehicle width direction is input to the front-rear extended portion 22 of the lower frame 40 via the side sill 50 at the time of a side collision, the deformation of the bottom face portion 41 in the vehicle width direction can be facilitated via the vertical holes 48 and the recess 49 serving as the deformation facilitating portion. As a result, the deformation amount of the bottom face portion 41 having a higher rigidity than the floor panel 2 becomes closer to the deformation amount of the facing face portion 2*b* of the floor panel 2.

Accordingly, the shearing strain according to the joined portion Z between the inner-side flange 44 and the floor panel 2 decreases, and hence the joining in the inner-side flange 44 is easily maintained. Therefore, the closed cross-section of the front-rear extended portion 22 in the lower frame 40 is easily maintained, and the support for the side sill 50 by the front-rear extended portion 22 from the vehicle-width-direction inner side is easily maintained. Thus, the inward falling deformation of the side sill 50 is suppressed.

(2) When the lower frame 40 is formed by press molding, for example, the deformation facilitating portion can be easily formed in the bottom face portion 41 in an integral manner as the vertical holes 48 and/or the recess 49.

(3) In the bottom face portion 41 in the front-rear extended portion 22 of the lower frame 40, the fourth vertical hole 48*d* and the recess 49 serving as the deformation facilitating portion are positioned to be disposed side by side in the vehicle width direction. Therefore, the bottom face portion 41 can be easily deformed so as to be reliably compressed in the vehicle width direction at a position in which the fourth vertical hole 48*d* and the recess 49 are formed in the front-rear direction.

(4) In the bottom face portion 41 in the front-rear extended portion 22 of the lower frame 40, the first and second vertical holes 48*a*, 48*b* serving as the deformation facilitating portion are positioned to be adjacent to each other in the vehicle front-rear direction, and the recess 49 and a third vertical hole 49*c* are positioned to be adjacent to each other in the vehicle front-rear direction. As a result, by at least two deformation facilitating portions disposed side by side in the vehicle front-rear direction, the bottom face portion 41 is easily deformed so as to be compressed in the vehicle width direction in a stable manner in a wide range in the front-rear direction.

(5) The bottom face portion 41 of the lower frame 40 is positioned above the lower face portion 55 of the side sill inner 51. Therefore, a ridge portion formed between the bottom face portion 41 and the outer wall portion 43 in the front-rear extended portion 22 of the lower frame 40 is positioned above the lower face portion 55 of the side sill inner 51, and the inner wall portion 53 of the side sill inner 51 is easily supported by the ridge portion having a high rigidity.

The collision load is reliably transmitted to the bottom face portion 41 of the lower frame 40 from the side sill inner 51, and hence the bottom face portion 41 is easily deformed so as to be compressed in the vehicle width direction in a stable manner. Therefore, when the collision load toward the vehicle-width-direction inner side acts on the side sill inner 51 at the time of a side collision, the side sill 50 is easily supported by the front-rear extended portion 22 in the lower frame 40, and the inward falling deformation of the side sill 50 is easily suppressed.

Meanwhile, when the bottom face portion 41 of the front-rear extended portion 22 in the lower frame 40 is positioned below the lower face portion 55 of the side sill inner 51, the inner wall portion 53 of the side sill inner 51 is not supported by the abovementioned ridge portion, and the collision load is not efficiently transmitted to the lower face portion 1 of the lower frame 40 from the side sill 50. When the bottom face portion 41 of the front-rear extended portion 22 is positioned at the same height as the lower face portion 55 of the side sill inner 51, the inward falling deformation of the side sill 50 easily occurs with the abovementioned ridge portion serving as the starting point.

(6) In the lower frame 40, the outer wall portion 43 is joined to the inner wall portion 53 of the side sill inner 51 at the front-rear extended portion 22. Therefore, when the collision load toward the vehicle-width-direction inner side acts on the side sill 50 at the time of a side collision, the front-rear extended portion 22 resists the inward falling deformation of the side sill 50 from the vehicle-width-direction inner side. Therefore, the inward falling deformation of the side sill 50 is even more easily suppressed.

(7) When the collision load in the vehicle width direction acts on the front-rear extended portion 22 of the frame member 20 via the side sill 50 at the time of a side collision, the out-of-plane deformation of the inner wall portion 42 of the front-rear extended portion 22 to the vehicle-width-direction inner side is suppressed by the ribs 47 serving as the high-rigidity portion. As a result, a case where the edge portions 46*a* of the horizontal holes 46 formed in the inner wall portion 42 are caused to have edge forms and protrude to the vehicle-width-direction inner side is suppressed, and hence the damage to the plurality of pipes 70 caused by the edge portions 46*a* is suppressed.

The abovementioned effect is particularly exhibited in a suitable manner when the inner wall portion 42 of the lower frame 40 is easily deformed locally as a result of the collision load being locally input to the front-rear extended portion 22 at the time of a side collision to a pole in which the collision load is locally concentrated.

(8) The battery 60 is mounted on the bottom face portion 41 of the lower frame 40 positioned above the lower face portion 55 of the side sill inner 51. Accordingly, as compared to when the battery 60 is mounted on the lower face of the side sill 50, the battery 60 is easily disposed on the upper side, and the deterioration of the ground clearance by the battery 60 can be suppressed.

(9) When the collision load in the vehicle width direction is input to the front-rear extended portion 22 of the lower frame 40 via the side sill 50 at the time of a side collision, in the front-rear extended portion 22, the collision energy transmitted to the inner wall portion 42 is absorbed by facilitating the deformation of the bottom face portion 41 in the vehicle width direction via the vertical holes 48 and the recess 49 serving as the deformation facilitating portion. As a result, in the front-rear extended portion 22, the out-of-plane deformation of the inner wall portion 42 is further suppressed.

(10) The ribs 47 serving as the high-rigidity portion are formed on portions of the inner wall portion 42 in the front-rear extended portion 22 of the lower frame 40 that easily come into contact with the pipes 70 at the time of a side collision because the pipe clips 76 are not provided. Therefore, the out-of-plane deformation of the portions of the inner wall portion 42 that easily come into contact with the pipes 70 is suppressed by the ribs 47, and hence a case where the edge portions 46a of the horizontal holes 46 come into contact with the pipes 70 is further suppressed.

(11) When the lower frame 40 is formed by press molding, for example, the high-rigidity portion can be easily formed on the inner wall portion 42 as the rib in an integral manner.

(12) The ribs 47 protrude to the vehicle-width-direction inner side from the inner wall portion 42. Therefore, when the collision load in the vehicle width direction is input to the front-rear extended portion 22 of the lower frame 40 via the side sill 50 at the time of a side collision, the ribs 47 are easily caused to hit the pipes 70 first prior to the inner wall portion 42. Therefore, the contact of the edge portions 46a of the horizontal holes 46 with the pipes 70 is further suppressed.

(13) The ribs 47 at least partially overlap with the pipes 70 in the up-down direction. Therefore, by the ribs 47, the out-of-plane deformation in portions of the inner wall portion 42 in the front-rear extended portion 22 of the lower frame 40 that face the pipes 70 is easily suppressed in a reliable manner. The ribs 47 of the inner wall portion 42 are easily caused to hit the pipes 70 first in a more reliable manner.

The present disclosure is not limited to the configurations described in the embodiment and various modifications can be made.

In the abovementioned embodiment, a case where the high-rigidity portion formed in the inner wall portion 42 of the lower frame 40 is composed of the ribs 47 that are convex to the vehicle-width-direction inner side from the inner wall portion 42 has been described, but the present disclosure is not limited thereto. The ribs 47 may be formed to be concave to the vehicle-width-direction outer side with respect to the inner wall portion 42.

Figure 13:
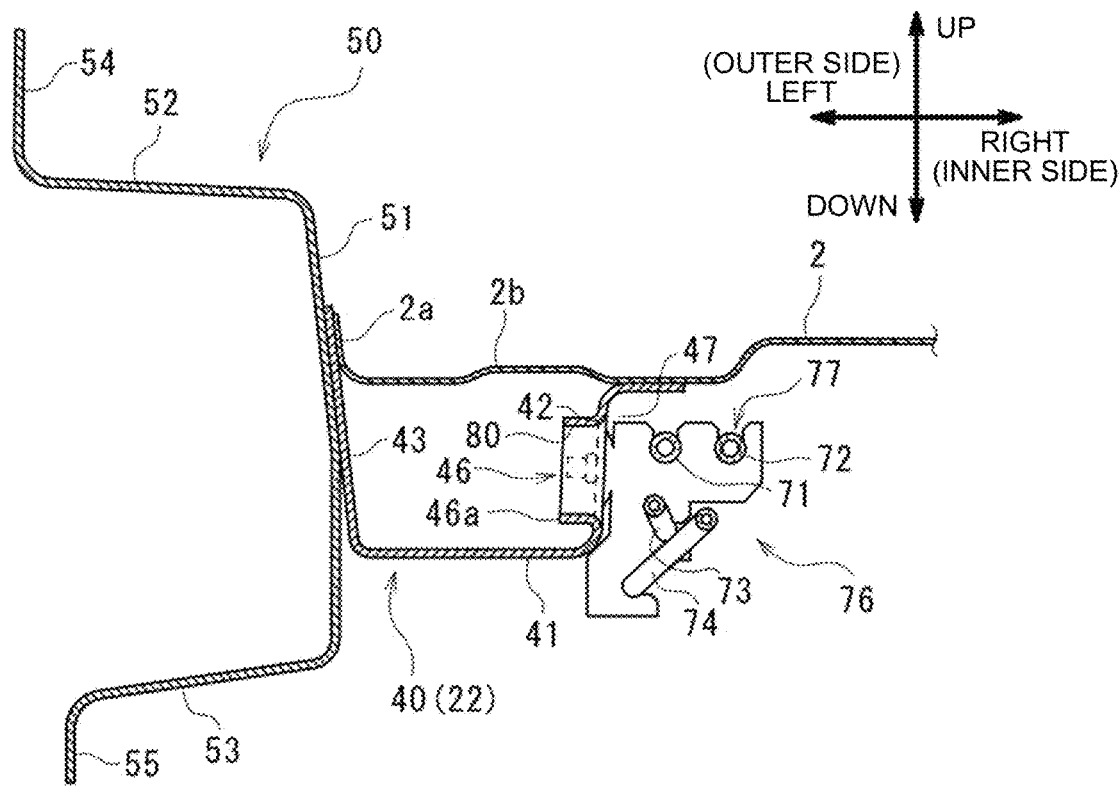
FIG. 13 is a cross-sectional view, similar to FIG. 6, illustrating a lower frame according to a modified example of the present disclosure.

As illustrated in FIG. 13, the high-rigidity portion may be configured as burring portions 80 that protrude to the inner side of the closed cross-section from the edge portions 46a of the horizontal holes 46 in a cylindrical form instead of the ribs 47. The rigidity of the edge portions 46a of the horizontal holes 46 can be increased by the burring portions 80. As a result, when a collision load in the vehicle width direction is input to the front-rear extended portion 22 of the lower frame 40 via the side sill 50 at the time of a side collision, the out-of-plane deformation in the periphery of the horizontal holes 46 in the inner wall portion 42 can be suppressed.

The burring portions 80 extend to the vehicle-width-direction outer side from the inner wall portion 42. Therefore, even when the burring portions 80 are deformed to the vehicle-width-direction inner side at the time of a side collision, end portions of the edge portions 46a of the horizontal holes 46 are not likely to come into contact with the pipes 70. Therefore, the contact of the edge portions 46a of the horizontal holes 46 with the pipes 70 can be further suppressed.

In the abovementioned embodiment, as the deformation facilitating portion formed in the bottom face portion 41 of the lower frame 40, the vertical holes 48 and the recess 49 are described as an example. However, the present disclosure is not limited thereto. The deformation facilitating portion may be configured as a protruding portion that protrudes downward from the bottom face portion 41 and extends in the front-rear direction. The protruding portion also constitutes the breakage trigger for a case where the bottom face portion 41 is deformed so as to be compressed in the vehicle width direction when a collision load toward the vehicle-width-direction inner side acts at the time of a side collision.

In the abovementioned embodiment, the deformation facilitating portion is formed in the bottom face portion 41 of the lower frame 40, and the deformation amount of the bottom face portion 41 in the vehicle width direction at the time of a side collision is configured to become closer to the deformation amount of the facing face portion 2b of the floor panel 2 that faces thereto in the vehicle width direction. In one embodiment, the deformation facilitating portion is configured such that the deformation amounts of the bottom face portion 41 and the facing face portion 2b are equivalent. In one embodiment, the deformation facilitating portion is configured such that the deformation speeds of the bottom face portion 41 and the facing face portion 2b are also equivalent. In the present description, the expressions of "the deformation amounts of the bottom face portion 41 and the facing face portion 2b are equivalent" and "the deformation speeds of the bottom face portion 41 and the facing face portion 2b are equivalent" mean that the value of one of the above is within the range of ±10% of the value of the other.

In this case, a misalignment of the inner-side flange 44 with respect to the floor panel 2 in the vehicle width direction rarely occur. Therefore, the shearing strain according to the joined portion Z between the inner-side flange 44 and the floor panel 2 becomes substantially zero, and the joining in the inner-side flange 44 with respect to the floor panel 2 is maintained even more.

In the abovementioned embodiment, a case where the front-rear extended portion 22 is composed of the lower frame 40 has been described as an example, but the present disclosure can also be suitably applied to a case where the front-rear extended portion 22 is composed of the upper frame 30. In other words, the high-rigidity portion only needs to be formed on a portion at which the front-rear extended portion 22 faces the pipes 70, and the deformation facilitating portion only needs to be formed in a portion facing the floor panel 2 with respect to the upper frame 30 and/or the lower frame 40 constituting the front-rear extended portion 22.

In the abovementioned embodiment, a case where both of the deformation facilitating portion and the high-rigidity portion are included have been described as an example. However, from the viewpoint of facilitating the compressive deformation of the bottom face portion 41 of the lower frame 40 to the vehicle-width-direction inner side at the time of a side collision, the high-rigidity portion is not necessarily needed.

INDUSTRIAL APPLICABILITY

As described above, according to the lower vehicle-body structure of the vehicle according to some embodiments of the present disclosure, the support effect for the side sill by the front-rear extended portion can also be maintained at the time of a side collision, and hence it is possible to suitably use the lower vehicle-body structure in a manufacturing technical field of this type.

Finally, it should be noted that the above embodiments/examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

REFERENCE SIGNS LIST

2 Floor panel
20 Frame member
21 Inclined portion
22 Front-rear extended portion
30 Upper frame
40 Lower frame
46 Horizontal hole
47 Rib
48 Vertical hole
49 Recess
50 Side sill
51 Side sill inner
60 Battery
61 Battery bracket
70 Pipe
76 Pipe clip
100 Lower vehicle-body structure

The invention claimed is:

1. A lower vehicle-body structure of a vehicle, the lower vehicle-body structure comprising:
    a floor panel that constitutes a floor face portion of the vehicle;
    a side sill that extends in a vehicle front-rear direction on a vehicle-width-direction end portion of the vehicle; and
    a frame member that extends in a front-rear direction on a vehicle-width-direction inner side of the side sill and forms a closed cross-section together with the floor panel by being joined to the floor panel in an up-down direction, the frame member including a front-rear extended portion that is in abutment against the side sill on the vehicle-width-direction inner side and extends in the vehicle front-rear direction along the side sill, wherein
    the front-rear extended portion includes:
        a first face portion that faces the floor panel in the up-down direction;
        an inner wall portion that extends toward the floor panel from an inner end portion of the first face portion in a vehicle width direction; and
        an inner-side flange that extends to the vehicle-width-direction inner side from a distal end portion of the inner wall portion and is joined to the floor panel,
    a deformation facilitator that facilitates deformation of the first face portion in the vehicle width direction when a collision load in the vehicle width direction is input is formed in the first face portion, and
    a compression strength of a portion of the floor panel that forms a closed cross-section together with the front-rear extended portion to the vehicle-width-direction inner side is equivalent to a compression strength of the first face portion.

2. The lower vehicle-body structure of the vehicle according to claim 1, wherein the deformation facilitator is a bead that extends in the front-rear direction or a hole that penetrates in a vehicle up-down direction.

3. The lower vehicle-body structure of the vehicle according to claim 2, wherein
    a plurality of the deformation facilitators are provided, and
    the plurality of deformation facilitators include at least two of the deformation facilitators that are disposed side by side in the vehicle width direction.

4. The lower vehicle-body structure of the vehicle according to claim 3, wherein
    the plurality of deformation facilitators include at least two of the deformation facilitators that are disposed side by side in the vehicle front-rear direction.

5. The lower vehicle-body structure of the vehicle according to claim 4, wherein
    the front-rear extended portion is joined to the floor panel from below, and
    a lower face of the front-rear extended portion is positioned above a lower face of the side sill.

6. The lower vehicle-body structure of the vehicle according to claim 5, wherein the front-rear extended portion includes an outer wall portion extending toward the floor panel from a vehicle-width-direction outer end portion of the first face portion and is joined the side sill at the outer wall portion.

7. The lower vehicle-body structure of the vehicle according to claim 1, wherein
    a plurality of the deformation facilitators are provided, and
    the plurality of deformation facilitators include at least two of the deformation facilitators that are disposed side by side in the vehicle width direction.

8. The lower vehicle-body structure of the vehicle according to claim 1, wherein
    a plurality of the deformation facilitators are provided, and
    the plurality of deformation facilitators include at least two of the deformation facilitators that are disposed side by side in the vehicle front-rear direction.

9. The lower vehicle-body structure of the vehicle according to claim 1, wherein
    the front-rear extended portion is joined to the floor panel from below, and a lower face of the front-rear extended portion is positioned above a lower face of the side sill.

10. The lower vehicle-body structure of the vehicle according to claim 1, wherein the front-rear extended portion includes an outer wall portion extending toward the floor panel from a vehicle-width-direction outer end portion of the first face portion and is joined the side sill at the outer wall portion.

11. A vehicle comprising the lower vehicle-body structure of the vehicle according to claim 1.

12. A vehicle comprising the lower vehicle-body structure of the vehicle according to claim 6.

\* \* \* \* \*